(12) United States Patent
Yabe et al.

(10) Patent No.: US 7,902,806 B2
(45) Date of Patent: Mar. 8, 2011

(54) LOAD CONTROL UNIT

(75) Inventors: Hiroo Yabe, Susono (JP); Kazuhiro Kubota, Susono (JP); Kazuya Tsubaki, Susono (JP); Masato Sasahara, Susono (JP)

(73) Assignee: Yazaki Corporation, Tokyo (JP)

( * ) Notice: Subject to any disclaimer, the term of this patent is extended or adjusted under 35 U.S.C. 154(b) by 266 days.

(21) Appl. No.: 12/219,585

(22) Filed: Jul. 24, 2008

(65) Prior Publication Data

US 2009/0027029 A1    Jan. 29, 2009

(30) Foreign Application Priority Data

Jul. 26, 2007    (JP) ................................. P2007-194873

(51) Int. Cl.
*G05F 1/575* (2006.01)
(52) U.S. Cl. ........................................................ 323/288
(58) Field of Classification Search .................. 323/288; 320/106, 107; 327/131, 132, 138
See application file for complete search history.

(56) References Cited

U.S. PATENT DOCUMENTS

| | | | | |
|---|---|---|---|---|
| 3,700,934 A | * | 10/1972 | Swain | 327/513 |
| 5,754,036 A | * | 5/1998 | Walker | 323/237 |
| 5,929,538 A | * | 7/1999 | O'Sullivan et al. | 307/66 |
| 5,936,317 A | * | 8/1999 | Sasanouchi et al. | 307/10.7 |
| 5,949,213 A | * | 9/1999 | Lanni | 320/106 |
| 6,751,080 B2 | * | 6/2004 | Yamaji | 361/93.8 |
| 7,301,129 B1 | * | 11/2007 | Yabe | 219/505 |
| 7,589,512 B2 | * | 9/2009 | Yabe | 323/288 |

FOREIGN PATENT DOCUMENTS

JP    2001-148294    5/2001

* cited by examiner

*Primary Examiner* — Adolf Berhane
*Assistant Examiner* — Yemane Mehari
(74) *Attorney, Agent, or Firm* — Morgan, Lewis & Bockius LLP

(57) ABSTRACT

A load control unit for controlling the supply of an electric power to a load from battery in accordance with a pulse-width modulation control includes: a reference voltage generating unit; a first charging/discharging unit; a second charging/discharging unit connected in series to the first charging/discharging unit to charge and discharge in reverse to those of the first charging/discharging unit; a first comparing unit that compares the voltage of the first charging/discharging unit with the reference voltage and switches between the charge and discharge of the first charging/discharging unit to generate a triangle wave; and a second comparing unit that compares a divided voltage by dividing the voltage of the battery with the voltage of the triangle wave generated by the first comparing unit to generate a PWM pulse. The ratio of capacities between the first and second charging/discharging units approximates to the ratio of resistances for obtaining the divided voltage.

3 Claims, 6 Drawing Sheets

LOAD CONTROL UNIT

BACKGROUND OF THE INVENTION

1. Technical Field

The present invention relates to a load control unit for controlling a load correspondingly to a fixed input without using a constant voltage source.

2. Background Art

Usually, as a load control unit for controlling a load for a vehicle such as a lamp mounted on a vehicle in accordance with a pulse width modulation (PWM), a load control unit has been known that meets two input patterns of a fixed input and a pulse input from a control unit such as an electronic control unit (ECU) mounted on a vehicle or a control unit of a relay integration.

In such a kind of the load control unit, a driving control signal is generated whose level is changed by a prescribed frequency (period) and duty relative to the fixed input, or a driving control signal is generated whose level is changed by the same frequency and duty as those of the pulse input to control the load for the vehicle to be driven by the driving control signal.

As described above, the load control unit is made to meet the two input patterns, because the load control unit is allowed to have general-purpose characteristics that can widely meet many kinds of the ECUs or the relay integration different depending on the grades of the vehicles.

Ordinarily, in order to allow the load control unit to meet the two input patterns, a circuit for the fixed input whose circuit structure is complicated is firstly designed, and then, when the load control unit is made to meet the pulse input, the input and output of the load control unit are short-circuited in the circuit for the fixed input.

Specifically, a below-described method is proposed. That is, in this method, a separate IC for the pulse input is formed by changing a wiring pattern in an IC of the load control unit whose circuit is designed for the fixed input.

However, in this method, since a production process for changing the wiring pattern by using a photolithography technique and an etching technique is necessary, the production process is complicated and the number of photo-masks is increased. Thus, a problem arises that a production cost is increased.

Further, since the two kinds of ICs for the fixed input and the pulse input cannot be discriminated from each other at a glance, a problem arises that it is almost misleading to discriminate between both the ICs in an inspection process after the production process. Further, since the management of parts of the two kinds of ICs is troublesome, a cost for managing the parts is disadvantageously increased.

Further, a method is also proposed that a switch for short-circuiting the input and output of the load control unit is added to an inner part of the IC of the load control unit whose circuit is designed for the fixed input, and the switch is operated from an external part of the IC to change the IC to the IC for the pulse input.

According to this method, since the two input patterns can be met by the one IC, the respective problems in the above-described former method for forming another IC for the pulse input can be avoided. However, in the latter method for operating the switch for short-circuiting the input and output of the load control unit from the external part of the IC to change the IC to the IC for the pulse input, an operating terminal for operating the switch from the external part needs to be provided in the IC of the load control unit. In addition thereto, when the switch is operated, an external attaching element such as a resistor needs to be attached to the operating terminal. Therefore, since the number of terminals of the IC of the load control unit is increased and the externally attaching element is necessary, a problem arises that the mounting characteristics of the IC are deteriorated and the cost of the load control unit is increased.

As a load control unit that solves these problems, Patent Document 1 proposes a load control unit as shown in FIG. 4 that can meet two input patterns of a fixed input and a pulse input.

Namely, FIG. 4 shows a schematic structure of the load control unit in the Patent Document 1. In this load control unit, a voltage of a capacitor C1 is compared with a reference voltage Vt1 by a comparator CP1 on the basis of a current mirror circuit including resistors R6, R7 and R9 and transistors Q10 and Q11 connected to a constant voltage power source (Vc) 11 of the load control unit 10 and a constant current obtained by a resistor R1, the charging/discharging operations of the capacitor C1 are switched to generate a triangle wave, and this triangle wave is compared with a divided voltage Vk inputted to a plus input terminal of a comparator CP3 to obtain a PWM pulse.

In the drawing, there are provided an OR gate 12, a driving circuit 13, a load driving element 14 (FET) of Nch, a load 15, an ECU 20, and a battery 30 mounted on a vehicle.

Now, an operation of the load control unit in FIG. 4 will be described by referring to a timing chart shown in FIG. 5. One terminal of the capacitor C1 is connected to a charging/discharging circuit and the other terminal is connected to a GND terminal.

A circuit for generating the triangle wave includes transistors Q3 to Q11, resistors R1 to R10, the capacitor C1 and the comparator CP1. A constant current serving as a reference for charging/discharging the capacitor C1 is generated by a current mirror circuit composed of the transistors Q3 to Q5, and a current I5 supplied from the transistor Q5 serves to charge the capacitor C1.

A current I1 supplied from the transistor Q3 and a current I4 supplied from the transistor Q4 are values respectively equal to the current I5 supplied from the transistor Q5 as shown by a below-described expression (1).

$$I1=I4=I5 \qquad (1)$$

The current I1 is set by the resistor R1 and expressed by a below-described expression (2).

$$I1=(Vc-Vbe3)/R1 \qquad (2)$$

Here, Vbec designates a voltage between a base and an emitter of the transistor Q3.

Further, a current I6 expressed by a below-described expression (3) for discharging the capacitor C1 is generated by a current mirror circuit composed of the transistors Q6, Q8 and Q9.

$$I6=2*I4=2*I1 \qquad (3)$$

To the base of the transistor Q6, the transistor Q7 for a switch is connected. When the transistor Q7 is turned on, I6 is not supplied. Further, the reference voltage Vt1 is generated by the resistors R4, R5 and R6 connected in series to the Vc from the constant voltage source 11 and the transistor Q10. Under a state that the transistor Q10 is turned off, the reference voltage Vt1 becomes the upper limit voltage Vb of the triangle wave and is expressed by a below-described expression (4).

$$Vb=Vc*R5/(R4+R5) \qquad (4)$$

Under a state that the transistor Q10 is turned on, the reference voltage Vt1 is a divided voltage of a combined resistance of the resistors R5 and R6 and the resistor 4 by neglecting the saturation voltage of the transistor Q10. The lower limit voltage Va of the triangle wave is expressed by a below-described expression (5).

$$Va=Vc*(R5*R6)(R4*R5+R4*R6+R5*R6) \quad (5)$$

When the voltage VC1 of the capacitor C1 is lower than the reference voltage Vt1 at a certain moment, the output of the comparator CP1 is Lo to turn off the transistors Q10 and Q11. When the transistor Q10 is turned off, the reference voltage Vt1 becomes a value of the upper limit voltage Vb of the triangle wave. When the transistor Q11 is turned off, since a current is supplied to the base of the transistor Q7 from the resistor R10, the transistor Q7 is turned on to turn off the transistors Q6, Q8 and Q9 and 16 is not supplied.

As a result, the capacitor C1 is charged by the I5 so that the voltage VC1 rises. When the voltage VC1 of the capacitor C1 even slightly exceeds the upper limit voltage Vb of the triangle wave, the output of the comparator CP1 becomes Hi to turn on the transistors Q10 and Q11. At this time, the transistor Q10 is turned on so that the reference voltage Vt1 falls to a value of the lower limit voltage Va of the triangle wave. When the transistor Q11 is turned on, since the transistor Q7 is off, the transistors Q6, Q8 and Q9 are turned on to supply the I6.

Since the I6 is two times as large as the I5, when the I5 is subtracted from the I6, the capacitor C1 is discharged by a current value of the I5. When the voltage VC1 of the capacitor C1 falls and slightly falls below the lower limit voltage Va of the triangle wave, the output of the comparator CP1 is inverted to Lo. In such a way, the triangle wave is obtained.

A period T of the triangle wave is expressed by a below-described expression (6).

$$
\begin{aligned}
T &= 2*(Vb-Va)*C1/I1 \\
&= [2*Vc*\{(R5/(R4+R5)- \\
&\quad (R5*R6)/(R4*R5+R4*R6+R5*R6)\}* \\
&\quad C1]/[(Vc-Vbe3)/R1]
\end{aligned}
\quad (6)
$$

A circuit for generating the PWM pulse includes resistors R11 and R12 and the comparator CP3. The divided voltage Vk is obtained by dividing the voltage by the resistors R11 and R12 and is expressed by a below-described expression.

$$Vk=Vc*R12/(R11+R12) \quad (7)$$

When the voltage VC1 of the capacitor C1 is higher than the divided voltage Vk, the output of the comparator CP3 is Lo. When the voltage VC1 of the capacitor C1 is lower than the divided voltage Vk, the output of the comparator CP3 is Hi.

Further, the output of the comparator CP3 is inputted to the driving circuit 13 via the OR gate 12. In the driving circuit 13, the input is inverted and outputted to the gate of the load driving element (FET) 14. When a control input is Hi, a gate voltage of the load driving circuit (FET) 14 is fixed to Lo so that the load driving element (FET) 14 is turned off and a load current is zero.

When the control input from the ECU 20 is Lo, the pulse of the comparator CP3 is made to be effective by the OR gate 12. When the output of the comparator CP3 is Lo, the output of the driving circuit 13 is Hi to turn on the load driving element (FET) 14 and supply the load current IL.

Here, a voltage drop arises in a wiring resistance RW by the load current IL. However, even when VIN as a voltage from the battery 30 mounted on a vehicle varies, since the Vc is maintained to a constant level by the constant voltage source 11, the accuracy of a frequency and a duty ratio can be maintained without especially considering the voltage characteristics of the circuit.

[Patent Document 1] JP-A-2001-148294

In the load control unit disclosed in the above-described Patent Document 1, even when the VIN as the voltage from the battery 30 mounted on a vehicle varies, since the Vc is maintained to the constant level by the constant voltage source 11, the accuracy of the frequency and the duty ratio are maintained without receiving an influence due to the variation of the VIN. However, there is a problem that the scale of a circuit of the constant voltage source 11 is large and the cost thereof is high.

In order to solve such a problem, a measure may be considered that the constant voltage source 11 is saved and other means is used so as not to lower the accuracy of a PWM output. Now, this method will be studied as described below.

In the case of a 12 V type power source of a motor vehicle, the VIN as the voltage from the battery 30 mounted on a vehicle that is a power source varies to 9 to 15 V or so. The period T of the triangle wave in this case is expressed by a below-described expression (8) by replacing Vc by VIN in the above-described expression (6).

$$T=[2*VIN*\{(R5/(R4+R5)-(R5*R6)/(R4*R5+R4*R6+R5*R6)\}*C1][(VIN-Vbe3)/R1] \quad (8)$$

Here, since the Vbe3 as the voltage between the base and the emitter of the transistor Q3 is about 0.6V, assuming that the VIN-Vbe3 is substantially equal to the VIN, the period T of the triangle wave is expressed by a below-described expression (9).

$$
\begin{aligned}
T &= [2*VIN*\{(R5/(R4+R5)-(R5*R6)/(R4*R5+R4* \\
&\quad R6+R5*R6)\}*C1]/[VIN/R1] \\
&= 2*\{(R5/(R4+R5)-(R5*R6)/(R4*R5+R4*R6+ \\
&\quad R5*R6)\}*C1*R1
\end{aligned}
\quad (9)
$$

Here, according to the expression (9), it is understood that T is determined only by C and R and does not depend on the VIN as the voltage from the battery 30 mounted on the vehicle. The duty ratio D is represented by D=ton/T. However, D is expressed by a below-described expression (10) in accordance with a graphical relation in FIG. 5.

$$D=(Vb-Vk)/(Vb-Va) \quad (10)$$

Further, D is expressed by a below-described expression (11) in accordance with the above-described expressions (4), (5) and (7).

$$
\begin{aligned}
D &= [VIN*\{(R5/(R4+R5)\}-VIN*\{R12/R11+R12)]/ \\
&\quad [VIN*\{(R5/(R4+R5)\}-VIN*\{(R5*R6)/(R4*R5+ \\
&\quad R4*R6+R5*R6)\} \\
&= [(R5/(R4+R5)-R12/(R11+R12)]/[R5/(R4+ \\
&\quad R5)-(R5*R6)/(R4*R5+R4*R6+R5*R6)]
\end{aligned}
\quad (11)
$$

Here, as understood from the expression (11), D is determined only by resistance values and is not affected due to the variation of the VIN.

However, in the actual load control unit 10, when the wiring resistance RW exists with a value that cannot be neglected, an operation as shown in FIG. 6 is exhibited.

That is, when the voltage VC1 of the capacitor C1 is higher than the divided voltage Vk to turn on the load driving element (FET) 14, the load current IL is supplied and the voltage drop by the wiring resistance RW arises. Since the divided voltage Vk is a resistance divided value of a source voltage, as a power source is more lowered, the divided voltage Vk gradually falls.

At this time, the reference voltage Vt1 of the triangle wave is likewise lowered. On the other hand, the voltage VC1 of the capacitor C1 is determined by an electric charge of the capacitor C1, and accordingly, even when the VIN is lowered, since the electric charge is not outputted nor inputted, the voltage VC1 is not lowered.

Since a current for charging/discharging the capacitor C1 is generated on the basis of the VIN, when the VIN is lowered, the current is decreased correspondingly thereto to change the inclination of the voltage VC1 of the capacitor C1. Then, when the voltage VC1 of the capacitor C1 is lower than the divided voltage Vk, since the load driving element (FET) 14 is turned off to stop the load current IL, the voltage of the VIN is reset and the divided voltage Vk is also reset.

However, since the discharging current of the capacitor C1 is changed, the inclination of the voltage VC1 of the capacitor C1 is merely changed. In this case, since the reference voltage Vt1, the divided voltage Vk and the voltage VC1 respectively receive the influence of the variation of the voltage due to the wiring resistance RW attended by the load current IL and are be individually varied, the above-described expressions (9) and (11) are not established. Thus, the period T of the triangle wave and the duty ratio D are varied.

As described above, in the variation of the VIN longer and slower than the period of a PWM, the period T of the triangle wave and the duty ratio D are not varied, however, when the VIN is varied by the wiring resistance RW during the period of the PWM, the period T of the triangle wave and the duty ratio D are varied. As the wiring resistance RW is larger, an amount of variation of them is also more increased.

As described above, in order to solve the problem that the constant voltage source 11 is large in its scale of a circuit and high in its cost, when the constant voltage source 11 is simply omitted, if the influence of the wiring resistance RW exists, the accuracy of a PWM output is deteriorated. Accordingly, a load control unit 10 has been desired to be developed in which even when the constant voltage source is omitted and the influence due to the variation of the VIN as the voltage from the battery 30 mounted on a vehicle or the influence due to the wiring resistance RW exists, the accuracy of the PWM output is not deteriorated.

SUMMARY OF THE INVENTION

The present invention is devised by considering such circumstances, and it is an object of the present invention to provide a load control unit that can solve the above-described problems.

According to the present invention, there is provided a load control unit that generates a driving control signal whose level is changed by a prescribed frequency and duty in accordance with a driving instruction signal at a prescribed level corresponding to a fixed input from a driving instruction unit so as to control the supply of an electric power to a load from a battery in accordance with a pulse-width modulation control by the driving control signal, the load control unit including: a reference voltage generating unit that generates a reference voltage of a triangle wave on the basis of the voltage of the battery; a first charging/discharging unit that charges and discharges to generate the triangle wave at a constant current proportional to the voltage of the battery; a second charging/discharging unit connected in series to the first charging/discharging unit to charge and discharge in reverse to the charge and discharge of the first charging/discharging unit; a first comparing unit that compares the voltage of the first charging/discharging unit with the reference voltage and switches between the charge and discharge of the first charging/discharging unit to generate the triangle wave; and a second comparing unit that compares a divided voltage obtained by resistively dividing the voltage of the battery with the voltage of the triangle wave generated by the first comparing unit to generate a PWM pulse for driving the load, wherein the ratio of capacities between the first and second charging/discharging units approximates to the ratio of resistances for obtaining the divided voltage.

Further, when the voltage of the first charging/discharging unit is lower than the reference voltage, the first charging/discharging unit charges and the second charging/discharging unit discharges so that the voltage of the first charging/discharging unit rises; and when the voltage of the first charging/discharging unit is higher than the reference voltage, the first charging/discharging unit discharges and the second charging/discharging unit charges so that the voltage of the first charging/discharging unit falls.

In the load control unit of the present invention, the reference voltage generating unit generates the reference voltage of the triangle wave on the basis of the voltage of the battery. The first charging/discharging unit charges/discharges to generate the triangle wave by the constant current proportional to the voltage of the battery. The second charging/discharging unit connected in series to the first charging/discharging unit charges/discharges in reverse to those of the first charging/discharging unit. The first comparing unit compares the voltage of the first charging/discharging unit with the reference voltage and switches between the charge and discharge of the first charging/discharging unit to generate the triangle wave. The second comparing unit compares the divided voltage obtained by resistively dividing the voltage of the battery with the voltage of the triangle wave generated by the first comparing unit to generate the PWM pulse for driving the load.

Here, since the ratio of the capacities between the first charging/discharging unit and the second charging/discharging unit approximates to the ratio of the resistances when the divided voltage is obtained, even when the voltage from the battery is varied, the reference voltage, the divided voltage and the voltage of the first charging/discharging unit are varied together so that an influence due to the variation of the voltage from the battery or an influence of the variation of the voltage due to a wiring resistance attended by a load current can be avoided.

According to the present invention, the load control unit is constructed so that the ratio of the capacities between the first charging/discharging unit and the second charging/discharging unit is approximated to the ratio of the resistances when the divided voltage is obtained, and even when the voltage from the battery is varied, the reference voltage, the divided voltage and the voltage of the first charging/discharging unit are varied together, and accordingly, an influence due to the variation of the voltage from the battery or an influence of the variation of the voltage due to the wiring resistance attended by the load current can be avoided. Thus, even when the constant voltage source is not provided, a highly accurate PWM output can be obtained, so that a compact size and a low cost of the device can be realized.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

According to the embodiments, a reference voltage generating unit generates a reference voltage of a triangle wave on the basis of the voltage of a battery. A first charging/discharging unit carries out charging/discharging operations for generating a triangle wave at a constant current proportional to the voltage of the battery. A second charging/discharging unit connected in series to the first charging/discharging unit carries out charging/discharging operations in reverse to those of the first charging/discharging unit. A first comparing unit compares the voltage of the first charging/discharging unit with the reference voltage and switches the charging/discharging operations of the first charging/discharging unit to generate a triangle wave. A second comparing unit compares a divided voltage obtained by dividing the voltage of the battery by resistances with the voltage of the triangle wave generated by the first comparing unit to generate a PWM pulse for driving a load.

Here, the ratio of the capacities between the first charging/discharging unit and the second charging/discharging unit approximates to the ratio of resistances when the divided voltage is obtained.

When the voltage of the first charging/discharging unit is lower than the reference voltage, the first charging/discharging unit is charged, and a discharging operation is carried out by the second charging/discharging unit. Thus the voltage of the first charging/discharging unit rises. When the voltage of the first charging/discharging unit is higher than the reference voltage, a discharging operation is carried out by the first charging/discharging unit and the second charging/discharging unit is charged. Thus the voltage of the first charging/discharging unit falls.

According to the configuration, even when the voltage from the battery is varied, the reference voltage, the divided voltage and the voltage of the first charging/discharging unit are varied together. Accordingly, an influence due to the variation of the voltage from the battery or an influence of the variation of the voltage due to a wiring resistance attended by a load current can be avoided. Thus, even when a constant voltage source is not provided, since a highly accurate PWM output can be obtained, a compact size and a low cost of a device can be realized.

EMBODIMENT

Figure 1:
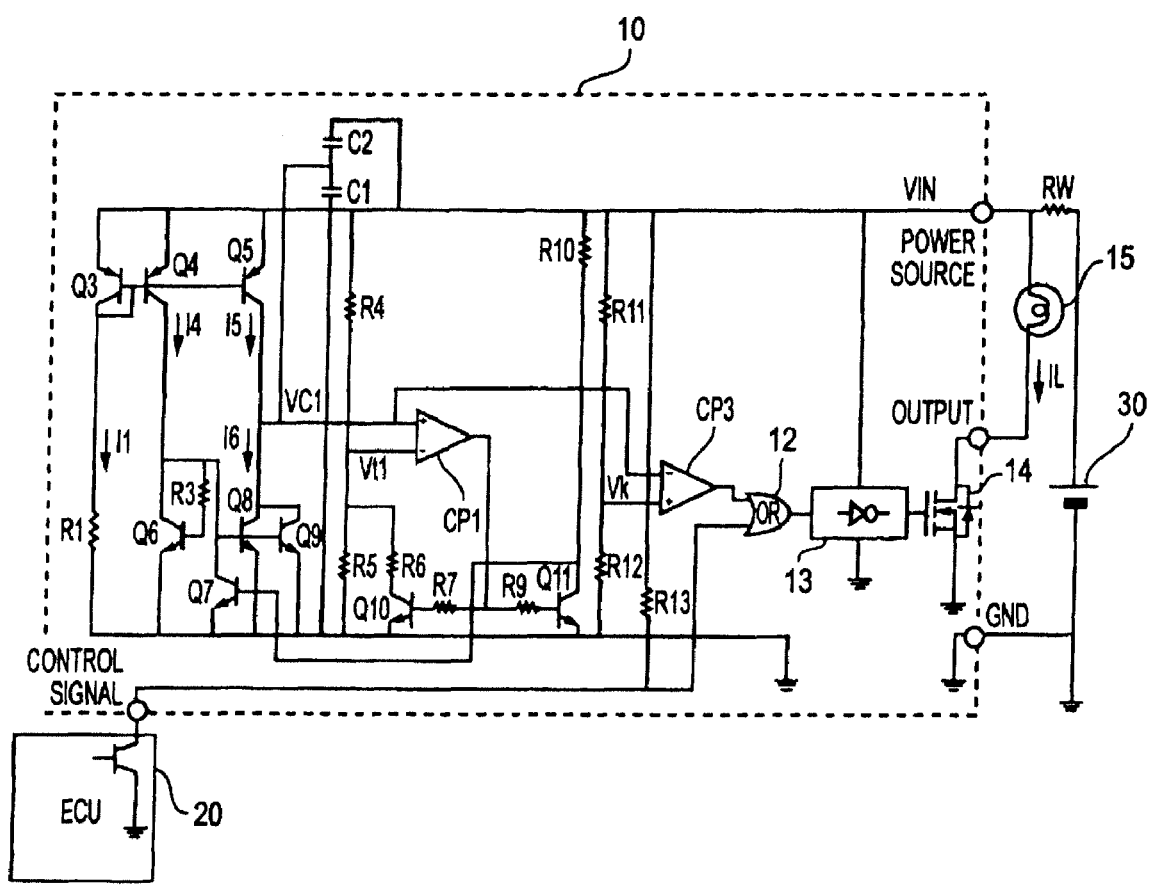
FIG. 1 is a circuit diagram for explaining one embodiment of a load control unit of the present invention.

Now, a detail of an embodiment of the present invention will be described below. FIG. 1 is a diagram for explaining one embodiment of a load control unit of the present invention. In the drawings shown below, parts common to those in FIG. 4 are designated by the same reference numerals and duplicated parts will be suitably described.

Figure 4:
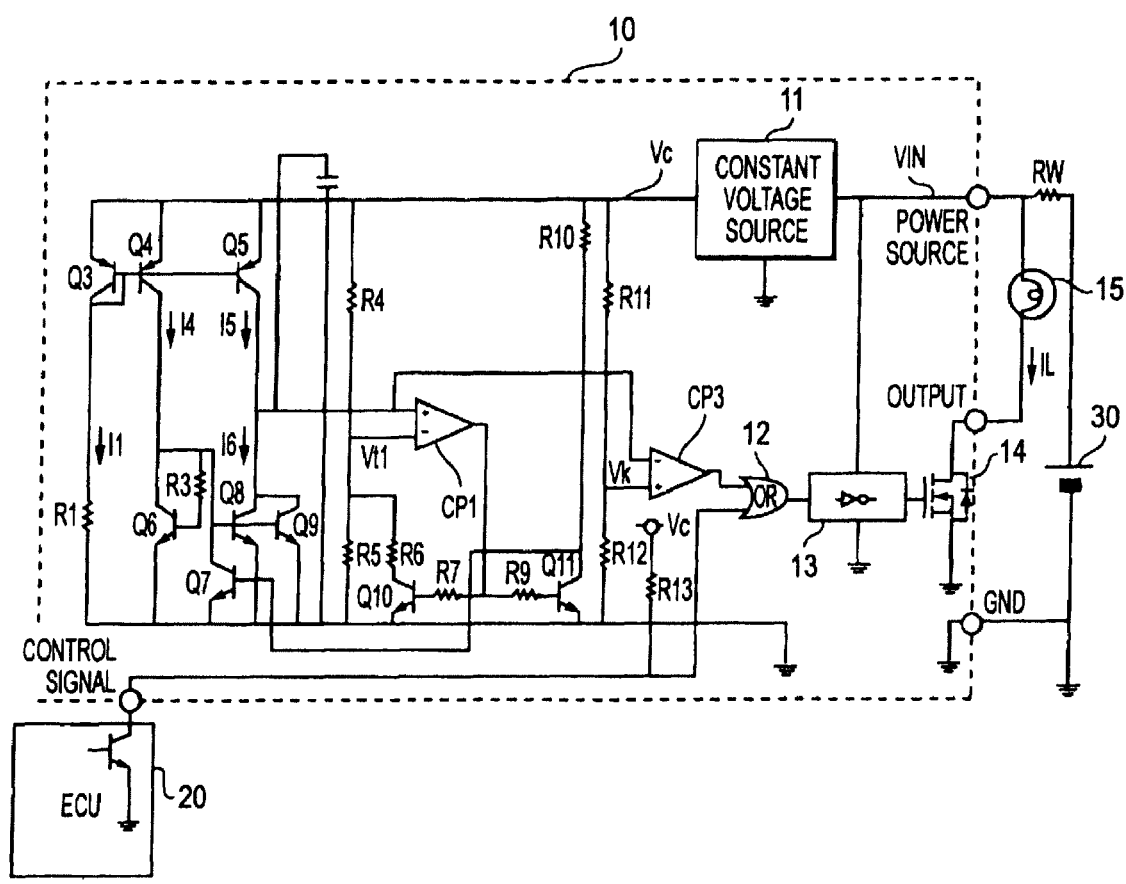
FIG. 4 is a circuit diagram showing one example of a usual load control unit.
Figure 5:
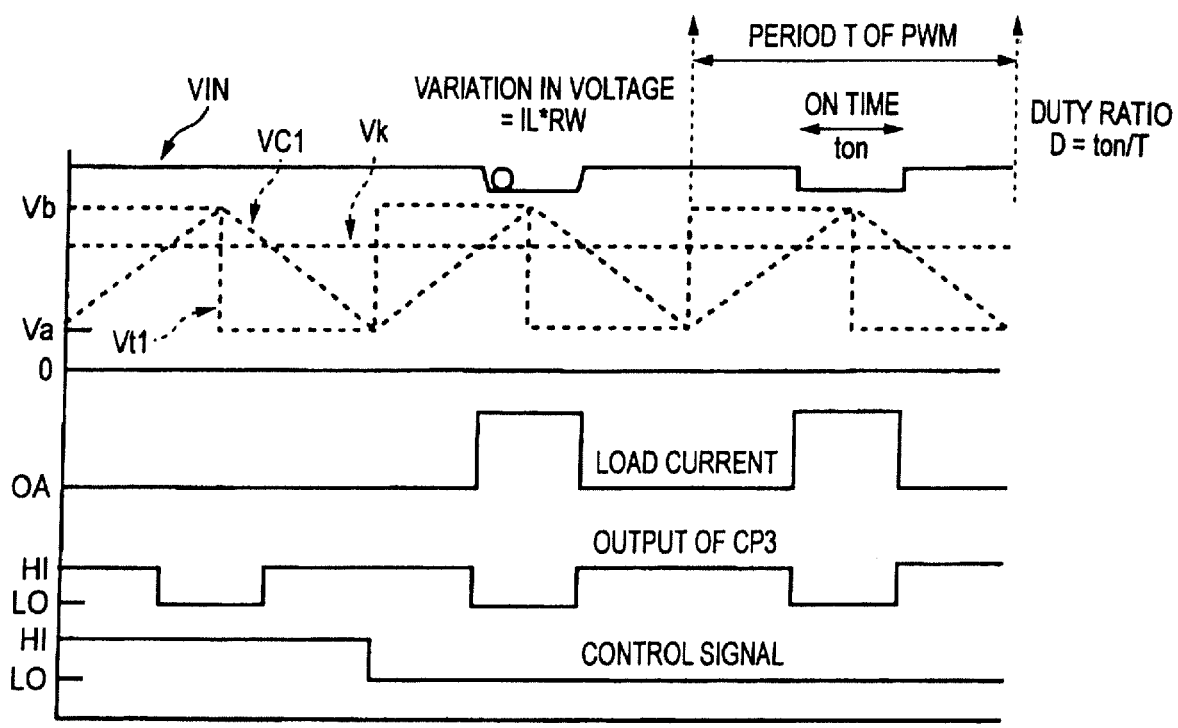
FIG. 5 is a timing chart for explaining an operation of the load control unit shown in FIG. 4.
Figure 6:
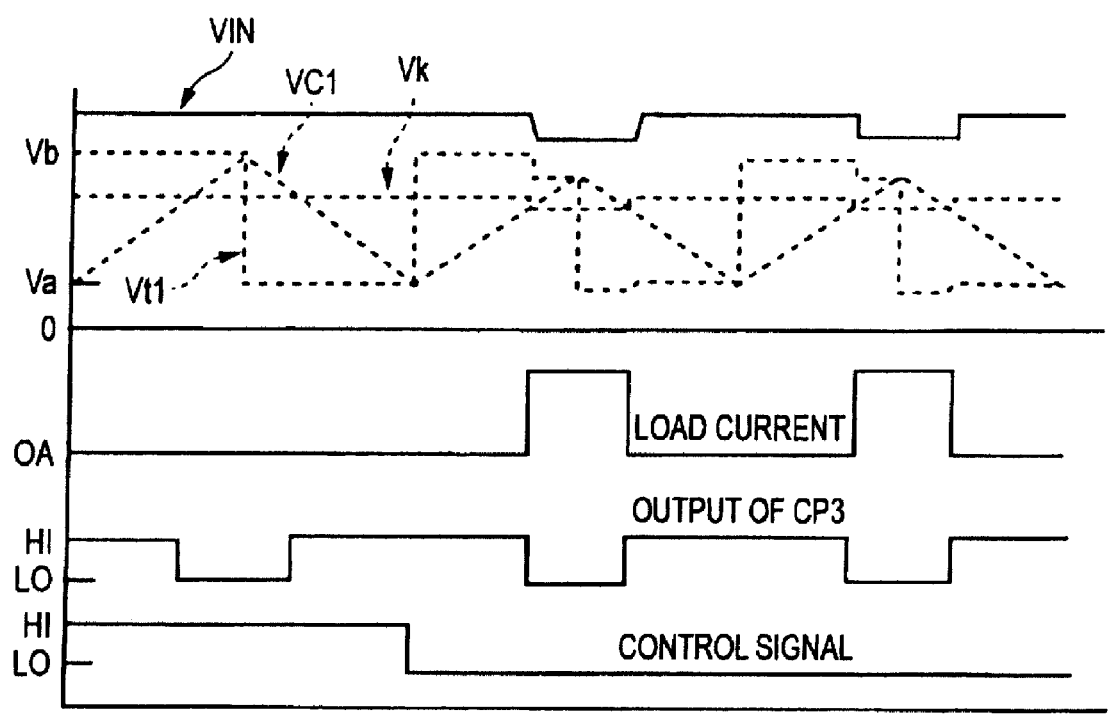
FIG. 6 is a timing chart for explaining an operation of the load control unit shown in FIG. 4.

A load control unit 10 shown in FIG. 1 is different from the structure of the usual load control unit 10 shown in FIG. 4 in view of a point that the constant voltage source 11 shown in FIG. 4 is removed and a capacitor C2 connected in series to a capacitor C1 is added in place thereof.

Further, though other elements than the constant voltage are not described clearly in the usual load control unit 10 shown in FIG. 4, the load control unit of this embodiment is different from the structure of the usual load control unit 10 shown in FIG. 4 in view of a point that a constant current for charging/discharging a triangle wave, upper and lower limit voltages of the triangle wave and a setting voltage of a duty ratio are generated by resistors. Namely, the fact that the constant current for charging/discharging the triangle wave, the upper and lower limit voltages of the triangle wave and the setting voltage of the duty ratio are generated by the resistors indicates that a VIN as a voltage from a battery 30 mounted on a vehicle serving as a source voltage rises, a current is increased proportionally thereto. As a result, the above-described expression (9) representing the period T of the triangle wave and the above-described expression (11) representing the duty ratio D are established. Thus, even when the constant voltage source 11 as shown in FIG. 4 is removed and the influence of the wiring resistance RW exists, the accuracy of a PWM output is not deteriorated.

Here, the load control unit 10 shown in FIG. 1 includes a capacitors C1 and C2, a comparator CP1, a comparator CP3, an OR gate 12, a driving circuit 13, a load driving element (FET) 14, resistors R1 to R13, transistors Q3 to Q11 or the like.

The load control unit 10 to which a power is supplied from a battery 30 to be mounted on a vehicle controls a load 15 such as a lamp to be mounted on a vehicle under a pulse width modulation (PWM) correspondingly to a fixed input from an ECU 20. Here, the load control unit 10 controls the load under the pulse width modulation (PWM) correspondingly to the fixed input from the ECU 20, however, a switch for switching either the fixed input or a pulse input may be added to carry out a pulse width modulation (PWM) control meeting two input patterns of the fixed input and the pulse input.

A plus side of the battery 30 to be mounted on the vehicle is connected to a power terminal through a wiring resistance RW and a minus side of the battery 30 to be mounted on the vehicle is connected to a GND terminal of the load control unit 10 and connected to a body of the vehicle and grounded.

In the ECU 20 as a driving instruction unit, an NPN transistor is provided. An emitter of the transistor is grounded. A collector thereof is connected to a control signal terminal of the load control unit 10. To a base thereof, a control signal generated in the ECU 20 is inputted.

The load 15 is connected between the power terminal and an output terminal of the load control unit 10. A voltage (VIN) from the battery 30 to be mounted on the vehicle is supplied to the load control unit 10 through the power terminal.

The capacitors C1 and C2 are connected in series. A voltage VC1 of the capacitor C1 is supplied to a plus input terminal of the comparator CP1. The capacitor C2 serves so as not to deteriorate the accuracy of the PWM output even when the usual constant voltage source 11 shown in FIG. 4 is removed and the influence of the wiring resistance exists. A detail of the capacitor C2 will be described below.

To a minus input terminal of the comparator CP1, a reference voltage Vt1 is supplied. To a plus input terminal of the comparator CP3, a divided voltage Vk is supplied. Then, a triangle wave is generated by the transistors Q3 to Q11, the resistors R1 to R10, the capacitors C1 and C2 and the comparator CP1, and the plus input terminal of the comparator CP1 serves as an output terminal of the triangle wave.

That is, a circuit for generating the triangle wave is formed with the transistors Q3 to Q11, the resistors R1 to R10, the capacitors C1 and C2 and the comparator CP1. A constant current serving as a reference for charging and the discharging the capacitor C1 is generated by a current mirror circuit composed of the transistors Q3 to Q5. A current I5 supplied from the transistor Q5 is a current for charging the capacitor C1.

To a minus input terminal of the comparator CP3, the triangle wave from the comparator CP1 is supplied and a compared result of the triangle wave with the divided voltage Vk is outputted to the OR gate 12. That is, a circuit for generating a PWM pulse is formed with the resistors R11 and R12 and the comparator CP3.

The driving circuit 13 inverts an input from the OR gate 12 to supply the result to the gate of the load driving element (FET) 14. Here, a signal supplied to the gate of the load driving element (FET) 14 is the PWM pulse.

Then, the load driving element (FET) 14 is turned on/off in accordance with the PWM pulse so that an electric power from the battery 30 to be mounted on the vehicle is supplied to the load 15.

Figure 2:
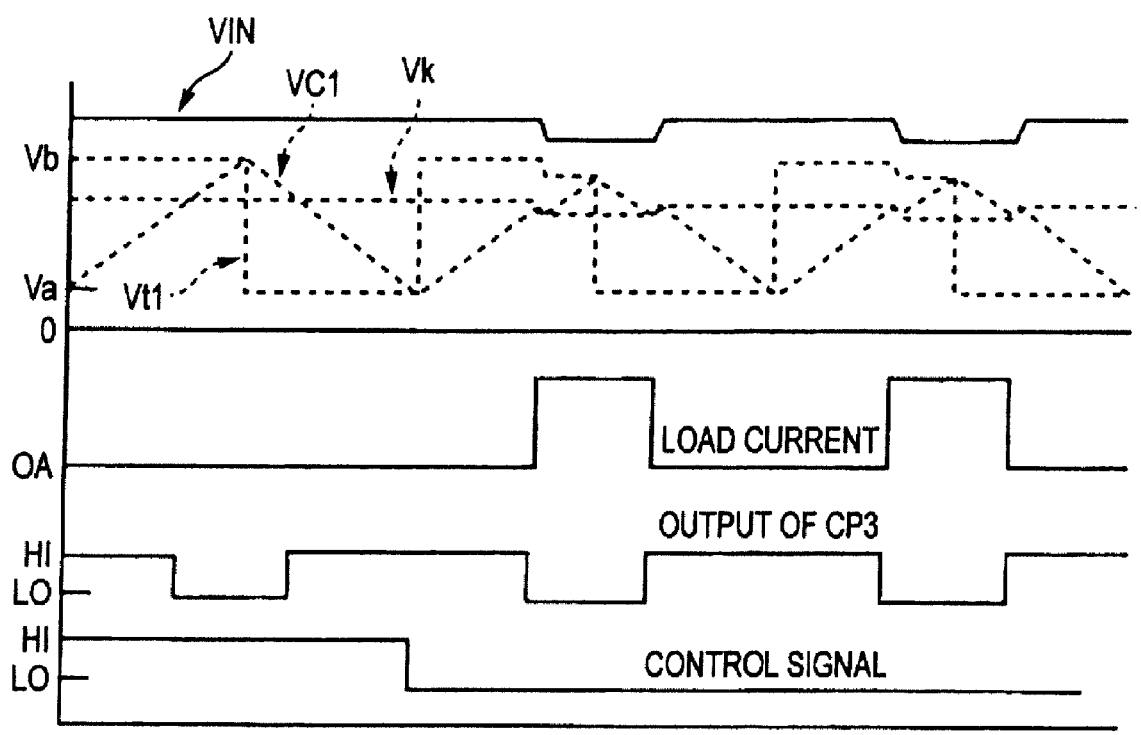
FIG. 2 is a timing chart for explaining an operation of the load control unit shown in FIG. 1.

Now, an operation of the load control unit 10 in this embodiment will be described by referring to a timing chart shown in FIG. 2.

Initially, one terminal of the capacitor C2 is connected to the circuit for generating the triangle wave including the transistors Q3 to Q11, the resistors R1 to R10 and the comparator CP1 together with the capacitor C1. The other terminal of the capacitor C2 is connected to the power terminal to which the VIN as the voltage from the battery 30 to be mounted on the vehicle is taken in. The capacity of the capacitor C2 will be described below.

Here, the voltage VC1 of the capacitor C1 is lower than the reference voltage Vt1, the capacitor C1 is charged by the current I5 from the transistor Q5 and the capacitor C2 is discharged to increase a voltage between the terminals of the capacitor C1 and decrease a voltage between the terminals of the capacitor C2. Accordingly, the voltage VC1 rises.

Namely, when the voltage VC1 of the capacitor C1 even slightly exceeds the upper limit voltage Vb of the triangle wave, a current I6 is supplied. Since the current I6 is two times as large as the current I5, when the current I5 is subtracted from the current I6, the capacitor C1 is discharged by the current value of the current I5 and the capacitor C2 is charged.

When the voltage VC1 of the capacitor C1 falls and slightly falls below the lower limit voltage Va of the triangle wave, the output of the comparator CP1 is inverted to Lo. In such a way, the triangle wave is obtained like the usual load control unit 10.

Here, the period T of the triangle wave is expressed by a below-described expression (12).

$$T = 2*(Vb-Va)*(C1+C2)/I1 \quad (12)$$
$$= [2*VIN*\{(R5/(R4+R5)-(R5*R6)/(R4*R5+R4*R6+R5*R6)\}*(C1+C2)]/[(VIN-Vbe3)/R1]$$
$$\approx 2*\{(R5/(R4+R5)-(R5*R6)/(R4*R5+R4*R6+R5*R6)\}*(C1+C2)*R1$$

The resistors R11 and R12 and the comparator CP3 serving as a part for generating the PWM pulse carry out the same operation as that of the usual load control unit 10 to obtain the PWM pulse. Here, when there is a wiring resistance RW of a value that cannot be neglected, if the voltage VC1 of the capacitor C1 is higher than the divided voltage Vk to turn on the load driving element (FET) 14, a load current IL is supplied and a voltage drop by the wiring resistance RW arises.

Here, assuming that a value obtained after the VIN as the voltage from the battery 30 to be mounted on the vehicle is varied by the wiring resistance RW is VIN', the VIN' is expressed by a below-described expression (13).

$$VIN'=VIN-IL*RW \quad (13)$$

Since the divided voltage Vk is a resistively divided voltage of the voltage (VIN) from the battery 30 to be mounted on the vehicle, the divided voltage Vk falls as the VIN is lowered. Assuming that a lowered value is Vk', the Vk' is expressed by a below-described expression (14).

$$Vk'=(VIN-IL*RW)*R12/(R11+R12) \quad (14)$$

A variable voltage of the divided voltage Vk is expressed by a below-described expression (15) from the above-described expressions (7) and (14).

$$Vk-Vk'=IL*RW*R12/(R11+R12) \quad (15)$$

On the other hand, assuming that an electric charge of the capacitor C1 immediately before the VIN as the voltage from the battery 30 to be mounted on the vehicle is suddenly changed is Q1 and an electric charge of the capacitor C2 is Q2, the total electric charge of the capacitors C1 and C2 connected in series is expressed by a below-described expression (16).

$$Q1-Q2=C1*VC1-C2*(VIN-VC1) \quad (16)$$

Assuming that the voltage VC1 of the capacitor C1 after the change is VC1' and the electric charges are respectively Q1' and Q2', the electric charges are expressed by a below-described expression (17).

$$Q1'-Q2'=C1*VC1'-C2*(VIN-IL*RW-VC1') \quad (17)$$

When the VIN as the voltage from the battery 30 to be mounted on the vehicle is suddenly changed, the individual electric charges of the capacitor C1 and the capacitor C2 are changed. However, since the total electric charge of the capacitor C1 and the capacitor C2 connected in series to each other is maintained, a below-described expression (18) is established from Q1−Q2=Q1'−Q2'.

$$C1*VC1-C2*(VIN-VC1)=C1*VC1'-C2*(VN-IL*RW-VC1') \quad (18)$$

This is arranged so that the voltage variation of the VC1 is expressed by a below-described expression (19).

$$VC1-VC1'=IL*RW*C2/(C1+C2) \quad (19)$$

Here, if a relation of Vk−Vk'=VC1−VC1' is established, since the variations of the divided voltage Vk and the voltage VC1 of the capacitor C1 are the same relative to the variation of the VIN in the above-described expression (13), the above-described expressions (9) and (11) are established. Thus, the period T of the triangle wave and a duty ratio D are not varied.

That is, from the above-described expressions (15) and (19), a below-described expression (20) is obtained.

$$IL*RW*R12/(R11+R12)=IL*RW*C2/(C1+C2) \quad (20)$$

When this is arranged, a below-described expression (21) is obtained.

$$C1/C2=R11/R12 \quad (21)$$

Namely, as shown by the expression (21), when the ratio between C1 and C2 is determined, the variations of the period T of the triangle wave and the duty ratio D are cancelled. In the expression (21), even when the ratio between C1 and C2 is not allowed to precisely correspond to the ratio between R1 and R2, an effect can be obtained for canceling the variations of the period T of the triangle wave and the duty ratio D.

Further, the ratio is set to a ratio deviating from the expression (21) so that the period T of the triangle wave and the duty ratio D can be intentionally varied relative to the variation of the VIN. Though an explanation is omitted, in this embodiment, an effect can be realized not only for a resistance component of a plus wiring, but also for a resistance component of a GND wiring. Further, it is to be understood that the effect can be achieved for an abrupt variation of a power due to a disturbance noise or the like.

As described above, in this embodiment, a circuit as a reference voltage generating unit including the resistors R4, R5 and R6 and the transistor Q10 generates the reference voltage of the triangle wave on the basis of the VIN as the voltage from the battery 30 to be mounted on the vehicle. The capacitor C1 as a first charging/discharging unit carries out charging/discharging operations for generating the triangle wave by the constant current proportional to the voltage of the battery 30 to be mounted on the vehicle. The capacitor C2 as a second charging/discharging unit connected in series to the capacitor C1 carries out charging/discharging operations reverse to those of the capacitor C1. The comparator CP1 as a first comparing unit compares the voltage (VC1) of the capacitor C1 with the reference voltage Vt1 and switches the charging/discharging operations of the capacitor C1 to generate the triangle wave. The comparator CP3 as a second comparing unit compares the divided voltage Vk obtained by dividing the VIN as the voltage of the battery 30 to be mounted on the vehicle by resistances with the voltage of the triangle wave generated by the comparator CP1 to generate the PWM pulse for driving the load 15.

Here, the ratio of the capacities between the capacitor C1 and the capacitor 2 is approximated to the ratio between the resistors R11 and R12 when the divided voltage is obtained as expressed by C1/C2≈R11/R12.

Further, when the voltage (VC1) of the capacitor C1 is lower than the reference voltage Vt1, the capacitor C1 charges and the capacitor C2 discharges. Accordingly, the voltage (VC1) of the capacitor C1 rises. When the voltage (VC1) of the capacitor C1 is higher than the reference voltage Vt1, the capacitor C1 discharges and the capacitor C2 charges, so that the voltage of the capacitor C1 falls.

Thus, even when the voltage from the battery 30 to be mounted on the vehicle is varied, the reference voltage Vt1, the divided voltage Vk and the voltage (VC1) of the capacitor C1 are varied together. Accordingly, an influence due to the variation of the VIN as the voltage from the battery 30 to be mounted on the vehicle or an influence of the variation of the voltage due to the wiring resistance RW attended by the load current IL can be avoided. Thus, even when the constant voltage source 11 as in the usual load control unit is not provided, since a highly accurate PWM output can be obtained, a compact size and a low cost of a device can be realized.

In this embodiment, a case is described that the Nch load driving element (FET) 14 is provided in a low side. However, the present invention is not limited to this example, and as shown in FIG. 3, the load driving element (FET) 14 may be provided in a high side.

In this case, the Nch load driving element (FET) 14 is replaced by a Pch load driving element (FET) 14a and a source side of the load driving element (FET) 14a is connected to one end of the load 15 and the other end of the load is grounded.

In such a structure, even when the constant voltage source 11 of the usual load control unit is not provided, the highly accurate PWM output can be obtained. Thus, the compact and low cost device can be realized.

Figure 3:
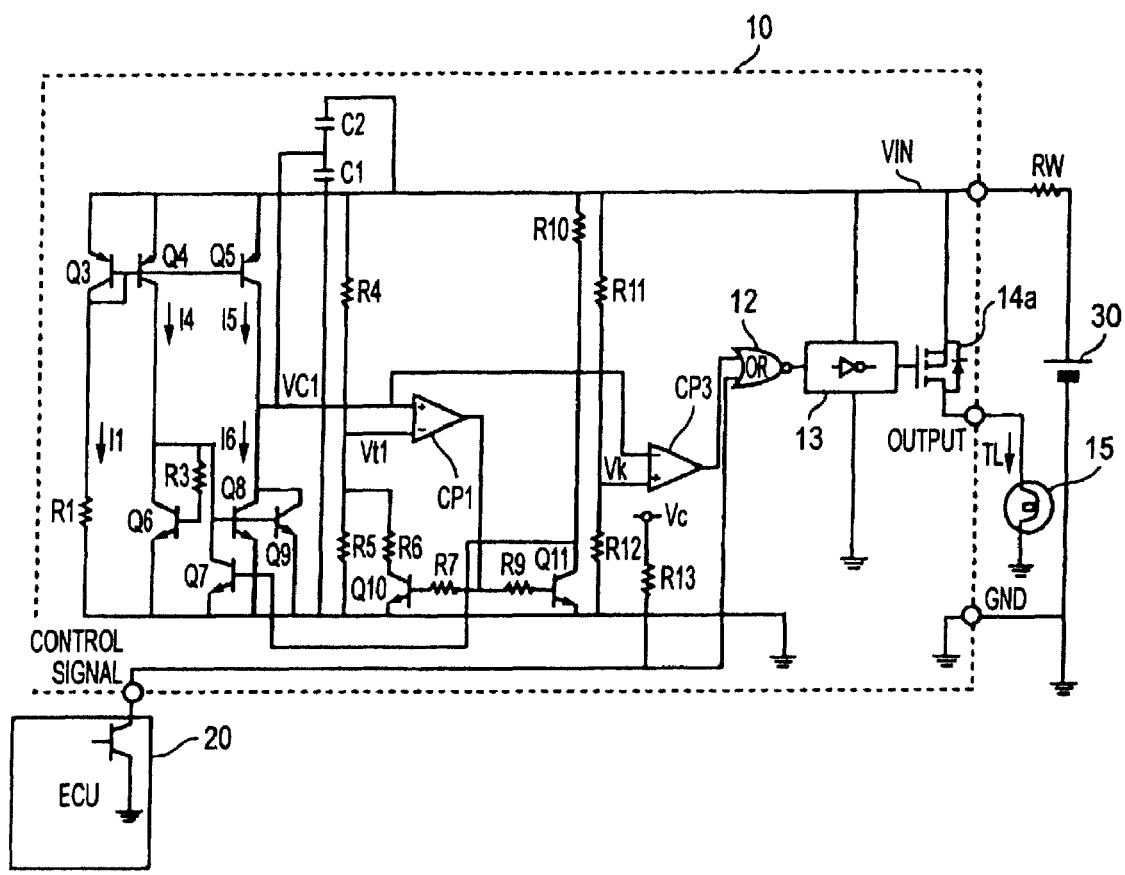
FIG. 3 is a circuit diagram showing another load control unit modified from the load control unit shown in FIG. 1.

In the load control units 10 shown in FIGS. 1 and 3, a part or all thereof may be formed with an integrated circuit.

Further, in this embodiment, a hysteresis is not provided in the comparator CP3, however, the hysteresis may be provided in the comparator CP3. In this case, the noise resistance or the stability of the comparator CP3 can be improved.

The present invention is not limited to the load control unit for PWM controlling the load for the vehicle such as the lamp to be mounted on the vehicle and may be applied to a load control unit for PWM controlling other driving system of an electric fan motor or the like.

What is claimed is:

1. A load control unit that generates a driving control signal whose level is changed by a prescribed frequency and duty in accordance with a driving instruction signal at a prescribed level corresponding to a fixed input from a driving instruction unit so as to control the supply of an electric power to a load from a battery in accordance with a pulse-width modulation control by the driving control signal, the load control unit comprising:
   a reference voltage generating unit that generates a reference voltage of a triangle wave on the basis of the voltage of the battery;
   a first charging/discharging unit that charges and discharges to generate the triangle wave at a constant current proportional to the voltage of the battery;
   a second charging/discharging unit connected in series to the first charging/discharging unit to charge and discharge in reverse to the charge and discharge of the first charging/discharging unit;
   a first comparing unit that compares the voltage of the first charging/discharging unit with the reference voltage and switches between the charge and discharge of the first charging/discharging unit so as to generate the triangle wave; and
   a second comparing unit that compares a divided voltage obtained by resistively dividing the voltage of the battery with the voltage of the triangle wave generated by the first comparing unit so as to generate a PWM pulse for driving the load,
   wherein the ratio of capacities between the first and second charging/discharging units approximates to the ratio of resistances for obtaining the divided voltage.

2. A load control unit according to claim 1, wherein when the voltage of the first charging/discharging unit is lower than the reference voltage, the first charging/discharging unit charges and the second charging/discharging unit discharges so that the voltage of the first charging/discharging unit rises; and wherein when the voltage of the first charging/discharging unit is higher than the reference voltage, the first charging/discharging unit discharges and the second charging/discharging unit charges so that the voltage of the first charging/discharging unit falls.

3. A load control unit according to claim 1, wherein the first and the second charging/discharging units are capacitors.

* * * * *